US005625767A

United States Patent [19]
Bartell et al.

[11] Patent Number: 5,625,767
[45] Date of Patent: Apr. 29, 1997

[54] METHOD AND SYSTEM FOR TWO-DIMENSIONAL VISUALIZATION OF AN INFORMATION TAXONOMY AND OF TEXT DOCUMENTS BASED ON TOPICAL CONTENT OF THE DOCUMENTS

[76] Inventors: Brian Bartell, 4449 Via Precipicio, San Diego, Calif. 92122; Robert Clarke, 8246 Caminito Modena, La Jolla, Calif. 92037

[21] Appl. No.: 402,839

[22] Filed: Mar. 13, 1995

[51] Int. Cl.$^6$ ............................................. G06T 11/00
[52] U.S. Cl. ..................... 395/140; 395/326; 395/605
[58] Field of Search .............................. 395/140, 133, 395/141, 155, 159–161, 600, 650, 63, 145, 147; 364/419.19

[56] References Cited

U.S. PATENT DOCUMENTS 5,440,742  8/1995  Schwanke ............................ 395/650

OTHER PUBLICATIONS

Gerard Salton, "Automatic term class construction using relevance—a summary of work in *automatic pseudoclassification*," Information Processing & Management, vol. 16, pp. 1–15, 1980.

Gerard Salton et al., *Introduction to Modern Information Retrieval*, McGraw-Hill, 1983, pp. 1–23, 118–156, 199–256.

William H. Press et al., *Numerical Recipes in C: The Art of Scientific Computing*, Cambridge University Press, 1988, pp. 317–324.

Alain Lelu, "From data analysis to neural networks: New prospects for efficient browsing through databases," *Journal of Information Science*, vol. 17, pp. 1–12, 1991.

J.B. Kruskal, "Nonmetric multidimensional scaling: A numerical method," *Psychometrika*, vol. 29, No. 2, pp. 115–129, Jun. 1964.

J.B. Kruskal, "Multidimensional scaling by optimizing goodness of fit to a nonmetric hypothesis," *Psychometrika*, vol. 29, No. 1, pp. 1–27, Mar. 1964.

Kai A. Olsen et al., "Ideation Through Visualization: The VIBE System," *Multimedia Review*, vol. 3, No. 3, pp. 48–59, 1992.

Roger N. Shepard, "The analysis of proximities: Multidimensional scaling with an unknown distance function. I.," *Psychometrika*, vol. 27, No. 2, pp. 125–140, Jun. 1962.

Roger N. Shepard, "The analysis of proximities: Multidimensional scaling with an unknown distance function. II.," *Psychometrika*, vol. 27, No. 3, pp. 219–246, Sep. 1962.

Louis Guttman, "What is Not What in Statistics," *The Statistician*, vol. 26, No. 2, pp. 81–107, Jun. 1977.

Richard K. Belew, *Adaptive Information Retrieval: Machine Learning in Associative Networks*, Ph.D. thesis, The University of Michigan, 1986.

Donald W. Dearholt et al., "Properties of Pathfinder Networks," in Roger W. Schvaneveldt, editor, *Pathfinder Associative Networks: Studies in Knowledge Organization*, NJ, Ablex, 1990, pp. 1–29.

David Dubin, "Document Analysis for Visualization," SIGIR '95, Seattle, WA, pp. 199–204, 1995.

Matthias Hemmje et al., "LyberWorld—A Visualization User Interface Supporting Fulltext Retrieval," SIGIR '94, Dublin, Ireland, pp. 249–259, Jul. 1994.

Douglas R. Cutting et al., "Scatter/Gather: A Cluster-based Approach to Browsing Large Document Collectsions," SIGIR '92, Copenhagen, Denmark, pp. 318–329, Jun. 1992.

Haruo Kimoto et al., "Associated Information Retrieval System (AIRS)—Its Performance and User Experience," *IEICE Trans. Inf. & Syst.*, vol. E76–D, No. 2, Feb. 1993.

*Primary Examiner*—Almis R. Jankus
*Attorney, Agent, or Firm*—Brown, Martin, Haller & McClain

[57] ABSTRACT

A method and system for aiding users in visualizing the relatedness of retrieved text documents and the topics to which they relate comprises training a classifier by semantically analyzing an initial group of manually-classified documents, positioning the classes and documents in two-dimensional space in response to semantic associations between the classes, and displaying the classes and documents. The displayed documents may be retrieved by an information storage and retrieval subsystem in any suitable manner.

22 Claims, 9 Drawing Sheets

METHOD AND SYSTEM FOR TWO-DIMENSIONAL VISUALIZATION OF AN INFORMATION TAXONOMY AND OF TEXT DOCUMENTS BASED ON TOPICAL CONTENT OF THE DOCUMENTS

BACKGROUND OF THE INVENTION

The present invention relates generally to information search and retrieval systems and, more specifically, to a method and system for displaying visual representations of retrieved documents and the topics to which they relate.

Information search and retrieval systems locate documents stored in electronic media in response to queries entered by a user. Such a system may provide multiple entry paths. For example, a user may enter a query consisting of one or more search terms, and the system searches for any documents that include the terms. Alternatively, a user may select a topic, and the system searches for all documents classified under that topic. Topics may be arranged in accordance with a predetermined hierarchical classification system. Regardless of the entry path, the system may locate many documents, some of which may be more relevant to the topic in which the user is interested and others of which may be less relevant. Still others may be completely irrelevant. The user must then sift through the documents to locate those in which the user is interested.

Systems may aid the user in sifting through the retrieved documents and using them as stepping stones to locate other documents of interest. Commercially available systems are known that sort the retrieved documents in order of relevance by assigning weights to the query terms. If the query accurately reflects the user's topic of interest, the user may quickly locate the most relevant documents.

Systems are known that incorporate "relevance feedback." A user indicates to the system the retrieved documents that the user believes are most relevant, and the system then modifies the query to further refine the search. For a comprehensive treatment of relevance ranking and relevance feedback, see Gerard Salton, editor, *The Smart Retrieval System—Experiments in Automatic Document Processing*, N.J., Prentice Hall, 1971; Gerard Salton, "Automatic term class construction using relevance—a summary of work in automatic pseudoclassification," *Information Processing & Management*, 16:1–15, 1980; Gerard Salton et al., *Introduction to Modern Information Retrieval*, McGraw-Hill, 1983.

Practitioners in the art have also developed systems for providing the user with a graphical representation of the relevance of retrieved documents. In the Adaptive Information Retrieval (AIR) system, described in R. K. Belew, *Adaptive Information Retrieval: Machine Learning in Associative Networks*, Ph.D. thesis, The University of Michigan, 1986, objects that include documents, keywords and authors are represented by nodes of a neural network. A query may include any object in the domain. The system displays dots or tokens on a video display that represent the nodes corresponding to the objects in the query. The system also displays tokens that represent nodes adjacent to those nodes and connects these related nodes with arcs in another system, known as Visualization by Example (VIBE), described in Kai A. Olson et al., "Visualization of a document collection: The VIBE system," Technical Report LIS033/IS91001, School of Library and Information Science, University of Pittsburgh, 1991, a user selects one or more points of interest (POIs) on a video display. The user is free to place the POIs anywhere on the screen. The user assigns a set of keywords to each POI. The system then retrieves documents and positions them between POIs to which they are related. The system determines the relatedness between a document and a POI in response to the frequency with which the keywords corresponding to the POI occur in the document. The system thus displays tokens representing similar documents near one another on the screen and tokens representing less similar documents farther apart.

Systems are known that automatically classify documents in an information retrieval system under a predetermined set of classes or a predetermined hierarchical taxonomy to aid searching. The objective in text classification is to analyze an arbitrary document and determine its topical content with respect to a predetermined set of candidate topics. In a typical system, a computer executes an algorithm that statistically analyzes a set of manually classified documents, i.e., documents that have been classified by a human, and uses the resulting statistics to build a characterization of "typical" documents for a class. Then, the system classifies each new document to be stored in the system, i.e. an arbitrary document that has not been previously classified, by determining the statistical similarity of the document to the prototype. Text classification methods include nearest-neighbor classification and Bayesian classification in which the features of the Bayesian classifier are the occurrence of terms in the documents.

It would be desirable to simultaneously visualize both the relatedness between text documents and classes and the relatedness between the classes themselves. These problems and deficiencies are clearly felt in the art and are solved by the present invention in the manner described below.

SUMMARY OF THE INVENTION

The present invention comprises an electronic document storage and retrieval subsystem, a document classifier, and a visualization subsystem. The present invention aids users in visualizing the relatedness of retrieved text documents and the topics to which they relate.

Documents stored in the retrieval subsystem are manually classified, i.e., categorized by human operators or editors, into a predetermined set of classes or topics. An automatic classifier is constructed by calculating statistics of term usage in the manually classified texts. This step trains the classifier or places the classifier in a state in which it can automatically, i.e., without intervention by human operators or editors, classify additional documents. The classifier then applies a suitable statistical text analysis method to the classes to determine the semantic relatedness between each pair of classes. The visualization subsystem uses a suitable multidimensional scaling method to determine the positions in two-dimensional space of the classes in response to the relatedness information. The resulting collection of positions, referred to herein as a semantic space map, thus represents the semantic relatedness between each class and every other class by the spatial distance between them. The visualization subsystem displays a token or icon representing each class on a suitable output device, such as a video display. The classes represented by tokens spatially closer to one another are more related than those represented by tokens spatially farther from one another. (For purposes of convenience and brevity, the term "classes" may be used synonymously hereinafter in place of the phrase "tokens or icons representing the classes.")

The visualization subsystem populates the semantic space map with the (manually classified) documents with which the classifier was trained as well as with new, i.e. automatically classified, documents. The classifier produces a set of class scores for each document, one score corresponding to each class. The visualization subsystem then positions the document in two-dimensional space relative to the classes.

The present invention may be used to aid a researcher or user in navigating through the documents. In response to a query entered by the user, the document retrieval system searches for a document using any suitable search method. The system then uses the populated semantic space map to retrieve the positions of the documents found in the search and displays tokens or icons representing those documents. (For purposes of convenience and brevity, the term "documents" may be used synonymously hereinafter in place of the phrase "tokens or icons representing the documents.") A user can rapidly focus in on the documents most related to the topics of interest by selecting and reading only the documents nearest those topics. The user can also browse through related documents by selecting documents in close proximity to each other on the display. By reading a few of the documents in close proximity to each other, the user can rapidly conclude that a particular cluster of documents is of interest or is not of interest without reading all of them. Moreover, the user can select and read a sampling of documents located in different directions around a particular location to determine the general direction in which the most interesting documents are likely to be located. The user can successively browse through documents located in that general direction until the user has located the desired documents or discovers a different direction in which interesting documents are likely to be located. The user can thus visualize the progress of the research by noting the "path" along which the user has browsed through documents and the spatial relationship of those documents to the topics.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DETAILED DESCRIPTION OF A PREFERRED EMBODIMENT

Figure 1:
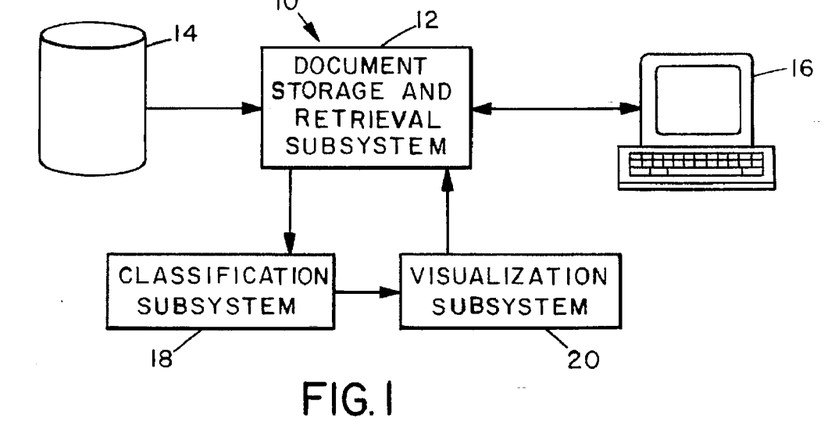
FIG. 1 is a diagrammatic illustration of the system of the present invention.

As illustrated in FIG. 1, a document storage and retrieval subsystem 10 comprises a search and retrieval controller 12, a disk 14 on which a database of documents is stored, and a video display terminal 16. A user (not shown) may input search queries via video display terminal 16. Unit 12 searches disk 14 for documents that are responsive to the query and displays the documents on terminal 16 in the manner described below. Although in the illustrated embodiment, documents are stored locally to subsystem 10 on disk 14, in other embodiments the documents may be retrieved via a network (not shown) from remote locations.

Terminal 16 displays the output of subsystem 10 to the user in a graphical format. A classification subsystem 18 classifies documents stored in subsystem 10 into one of a set of predetermined classes. A visualization subsystem 20 positions the classes on the screen of terminal 16 in a manner such that the distance between every two classes is representative of the extent to which those classes are related to each other relative to other classes. Visualization subsystem 20 also positions the retrieved documents on the screen of terminal 16 in a manner such that the distance between each document and a class is representative of the extent to which the document is related to that class relative to other classes. As noted above, the word "class," as used herein in the context of displayed output, denotes a displayed token or icon that represents the class. Similarly, the word "document," as used herein the context of displayed output, denotes a displayed token or icon that represents the document. Subsystem 10 may output the full document or a portion of it when a user selects the corresponding icon.

Subsystems 10, 18 and 20 may comprise any suitable combination of computer hardware and software that performs the methods described below. Persons of skill in the art will readily be capable of designing suitable software and/or hardware or obtaining its constituent elements from commercial sources in view of the teachings herein.

Figure 2:
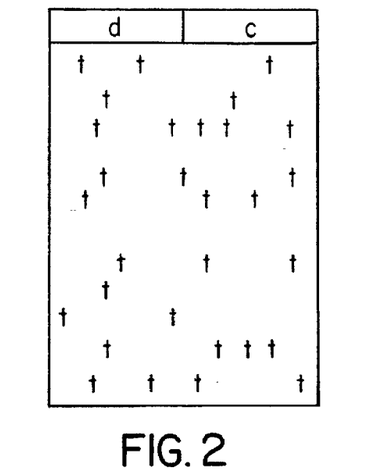
FIG. 2 is a diagrammatic illustration of a tagged or classified document.

As illustrated in FIG. 2, a document includes text, which comprises a set of terms (t). A term may be a word or phrase. A document of the type commonly stored in information storage and retrieval systems and the type with which the present invention is concerned, such as a news article, generally comprises many different terms. A person can read the text and categorize the document as relating to one or more of the classes. Some of the terms, such as the word "the" may be irrelevant to all classes. It should be understood that irrelevant or less relevant terms may be excluded from the set of terms used in the methods of the present invention. The document also includes an identifying number (d) and class numbers (c). The document text, its identifier (d) and classes (c) may be organized, stored and accessed by the software and hardware in any suitable manner.

Figure 3:
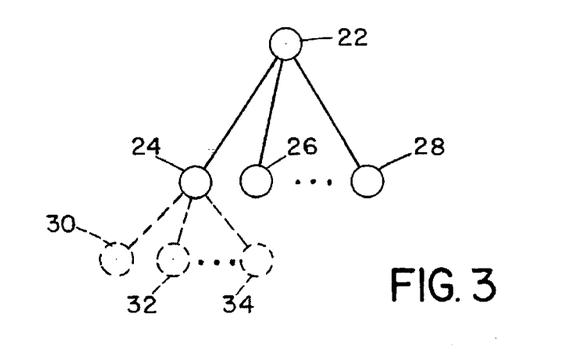
FIG. 3 is a diagrammatic illustration of a taxonomy into which the present invention classifies documents.

As illustrated in FIG. 3, the classes into which a document may be categorized define a taxonomy. The taxonomy may be hierarchical, as indicated by the combined portions of FIG. 3 in solid and broken line. The root 22 represents the most general level of knowledge in the subject with which the database is concerned if the database concerns all topics of knowledge, the root represents "All Knowledge." Each successive level of the hierarchy represents an increasing level of specificity. Classes 24, 26 and 28 are equally specific. If the database concerns all topics, classes 24, 26 and 28 may, for example, represent "Science," "Mankind," and "Religion," respectively. Classes 30, 32 and 34, which are subclasses of class 24 may, for example, represent "Astronomy," "Chemistry," and "Electronics," respectively. Alternatively, the taxonomy may be flat, as indicated by the portion of FIG. 3 in solid line. Each of the classes 24, 26 and 28 has equal specificity. If suitable class labels are chosen, any document in any database may be categorized into one or more of those classes.

Figure 4:
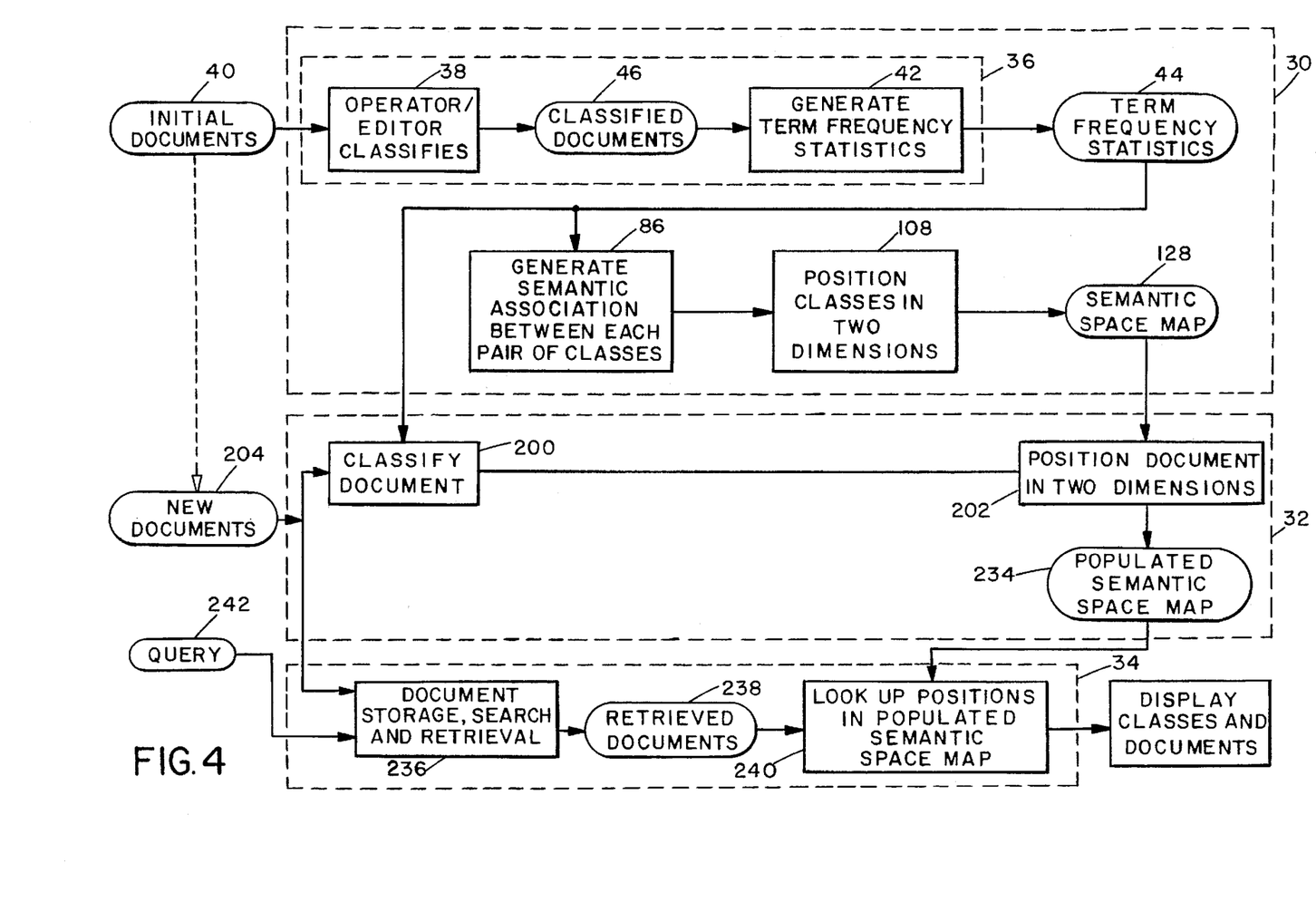
FIG. 4 is a flow diagram illustrating the method of the present invention.

As illustrated in FIG. 4, the present invention comprises the step 30 of generating a semantic space map, the step 32 of populating the semantic space map with documents in the database, and the step 34 of displaying the classes and retrieved documents in accordance with their positions on the populated semantic space map. The semantic space map, which defines the relative spatial positions of the classes and documents, is produced in response to statistical properties of the terms in the documents. An assumption underlying the present invention is that the topical relatedness of documents corresponds to their semantic relatedness.

Step 30 of generating a semantic space map comprises the step 36 of training a Bayesian classifier, which is described in further detail below. Step 36 comprises the step 38 of manually classifying each document in a database 40 into one of the predetermined classes. In other words, a person or editor, reads the document and decides the class or classes to which the document is most related. If the taxonomy is hierarchical, the person performing this classification must decide how general or specific the document is. For example, if the document relates to an overview of science, the person might classify it in "Science." If the document relates to the Moon, the person might classify it in "Astronomy." A document may be classified in multiple classes, such as both "Science" and "Astronomy." The document is tagged with the chosen class or classes, as described above with respect to FIG. 2.

Step 36 also comprises the step 42 of generating term frequency statistics 44 in response to the manually classified documents 46. The term frequency statistics include the frequency of each term in the documents in database 46 in each class, $F_{t,c}$. These statistics may be conceptually represented by a two-dimensional array having one dimension of a size equal to the total number of unique terms in the collection of documents in database 46 and having the other dimension of a size equal to the total number of classes. The term frequency statistics also include the total term frequency in each class, $F_c$. These statistics may be conceptually represented by a uni-dimensional array of a size equal to the number of classes.

Figure 5:
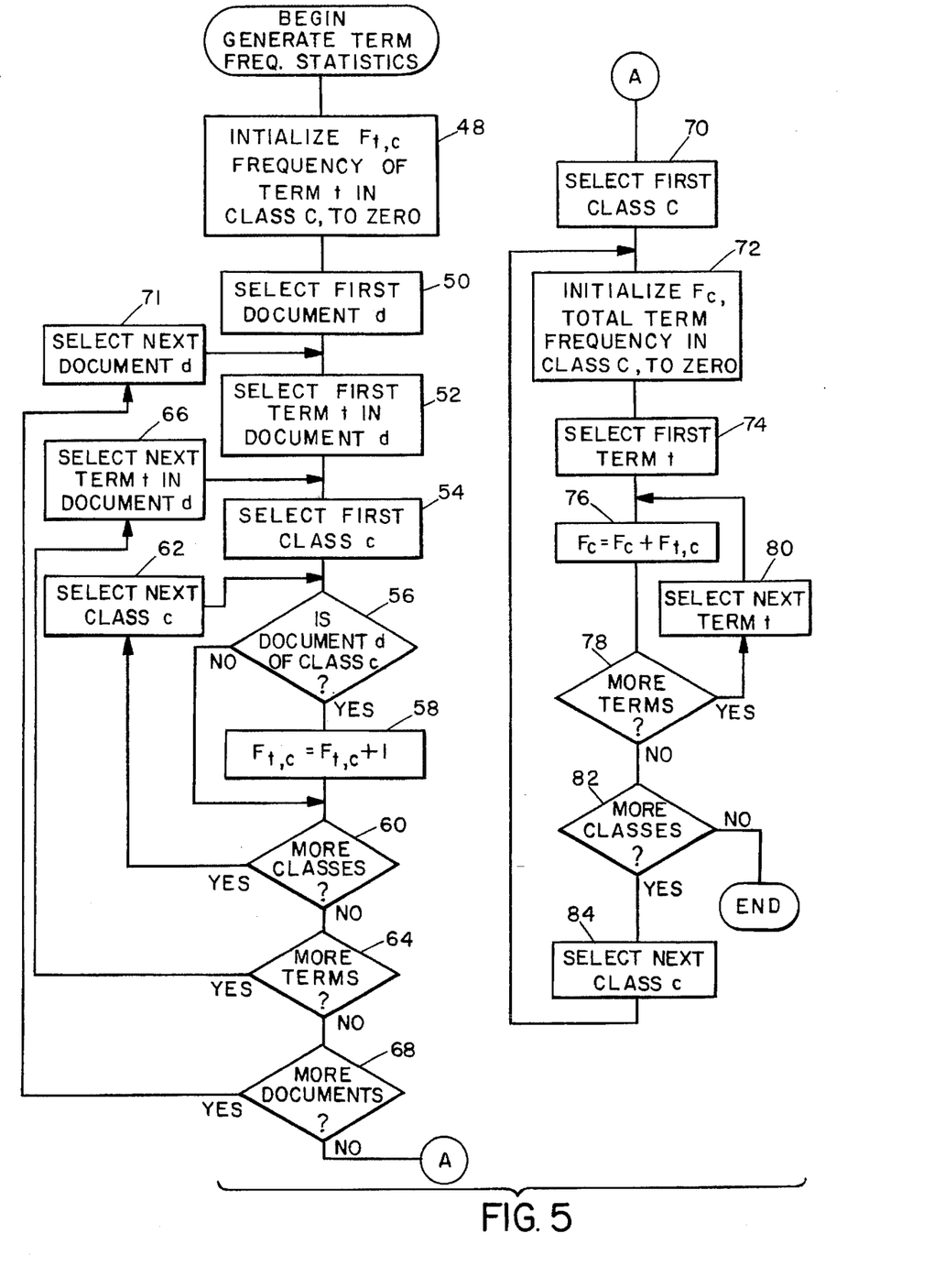
FIG. 5 is a flow diagram illustrating a method for generating term frequency statistics.

Step 42 comprises the steps illustrated in FIG. 5. At step 48, each $F_{t,c}$ is initialized to zero. At step 50, the first document (d) is selected from database 46. At step 52, the first term (t) is selected. At step 54, the first class (c) is selected. At step 56, it is determined whether the document (d) is classified in the class (c). If document (d) is classified in the class (c), $F_{t,c}$ is incremented at step 58. If document (d) is not classified in the class (c), the method proceeds to step 60. At step 60, it is determined whether all of the classes have been processed if the last class has not been processed, the method proceeds to step 62. At step 62, the next class is selected, and the method returns to step 56. If all classes have been processed, the method proceeds to step 64. At step 64, it is determined whether all terms in the document (d) have been processed. If the last term in the document (d) has not been processed, the method proceeds to step 66. At step 66, the next term (t) is selected, and the method returns to step 54. If all terms in the document (d) have been processed, the method proceeds to step 68. At step 68, it is determined whether all documents in database 46 have been processed. If the last document in database 46 has not been processed, the method proceeds to step 70. At step 70, the next document (d) is selected, and the method returns to step 52. If all documents in database 46 have been processed, the method proceeds to step 70. At this point in the method, the frequency of each term in the documents in database 46 in each class, $F_{t,c}$, has been calculated.

The method then calculates the total term frequency in each class, $F_c$, by summing $F_{t,c}$ over all terms that occur in documents of that class (c). At step 70, the first class (c) is selected. At step 72, $F_c$, the total term frequency in the selected class (c), is initialized to zero. At step 74, the first term (t) is selected. At step 76, the selected $F_{t,c}$ is added to $F_c$. At step 78 it is determined whether all terms have been processed. If the last term has not been processed, the method proceeds to step 80. At step 80, the next term (t) is selected, and the method returns to step 76. If all terms have been processed, the method proceeds to step 82. At step 82, it is determined whether all classes have been processed. If the last class has not been processed, the method proceeds to step 84. At step 84, the next class (c) is selected, and the method returns to step 72. Step 42 (FIG. 4) of generating term frequency statistics is completed when all classes have been processed.

Referring again to FIG. 4, step 30 of generating a semantic space map also comprises the step 86 of generating a semantic association, $S_{i,j}$, between each pair of classes, class $c_i$ and class $c_j$. These semantic associations may be conceptually considered as a two-dimensional array or matrix in which each dimension has a size equal to the total number of classes and in which the diagonal of the array represents the semantic association between each class and itself. The semantic association represents the extent to which the documents of each pair of classes are semantically related. Classes that use terms in similar frequency are more semantically related than those with dissimilar frequencies. Step 86 uses the term frequency statistics to determine the semantic association between each pair of classes. As described below, the term frequency statistics define class conditional probability distributions. The class conditional probability of a term, $(F_{t,c}/F_c)$, is the probability of the term (t) given the class (c). The probability distribution of a class (c) thus defines the probability that each term occurs in that class (c). The semantic association between each pair of classes is defined by the chi-squared difference between their probability distributions.

Figure 6:
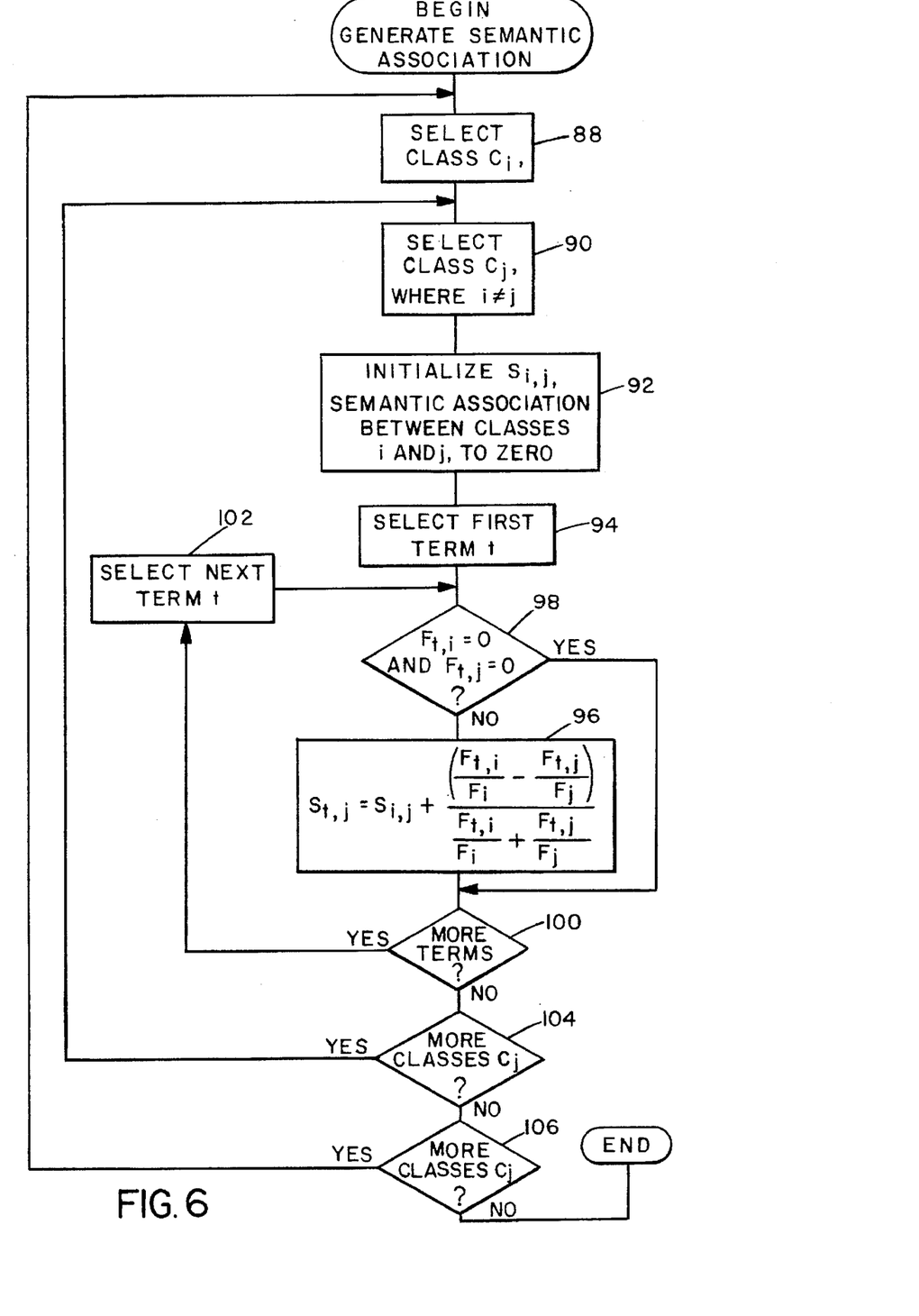
FIG. 6 is a flow diagram illustrating a method for generating a semantic association between every pair of classes.

Step 86 comprises the steps illustrated in FIG. 6. The first pair of classes is selected. At step 88, a class $c_i$ is selected. At step 90, a class $c_j$ is selected. The method successively selects pairs of classes at steps 88 and 90 until all unique pairs have been processed. The order in which the classes are selected is not critical. At step 92, $S_{i,j}$ is initialized to zero. At step 94, the first term (t) is selected. Each pair of classes is processed using each term. At step 96, $S_{i,j}$ is incremented by an amount equal to the chi-squared difference between the class conditional probabilities of the term (t). At step 98, it is determined whether the frequency of the term (t) in both classes is zero. If the frequency is zero, the chi-squared measure is ignored, and the method proceeds to step 100. At step 100, it is determined whether all terms have been processed. If the last term has not been processed, the method proceeds to step 102. At step 102, the next term (t) is selected, and the method returns to step 98. If all terms have been processed, the method proceeds to step 104. At steps 104 and 106, it is determined whether all classes have been processed. If the last class has not been processed, the method returns to step 88 or 90. Step 86 (FIG. 4) of generating a semantic association between each pair of classes is completed when all unique pairs of classes have been processed.

Referring again to FIG. 4, step 30 of generating a semantic space map also comprises the step 108 of positioning the classes in two dimensional space. As described below, the method uses a suitable non-metric multidimensional scaling (MDS) method, such as that described in J. B. Kruskal, "Multidimensional scaling by optimizing goodness of fit to a nonmetric hypothesis," *Psychometrika*, 29(1):1–27, March 1964 and J. B. Kruskal, "Nonmetric multidimensional scaling: A numerical method," *Psychometrika*, 29:115–129, 1964. The MDS transforms the semantic associations between the pairs of classes into spatial coordinates of the classes.

Figures 7, 10:
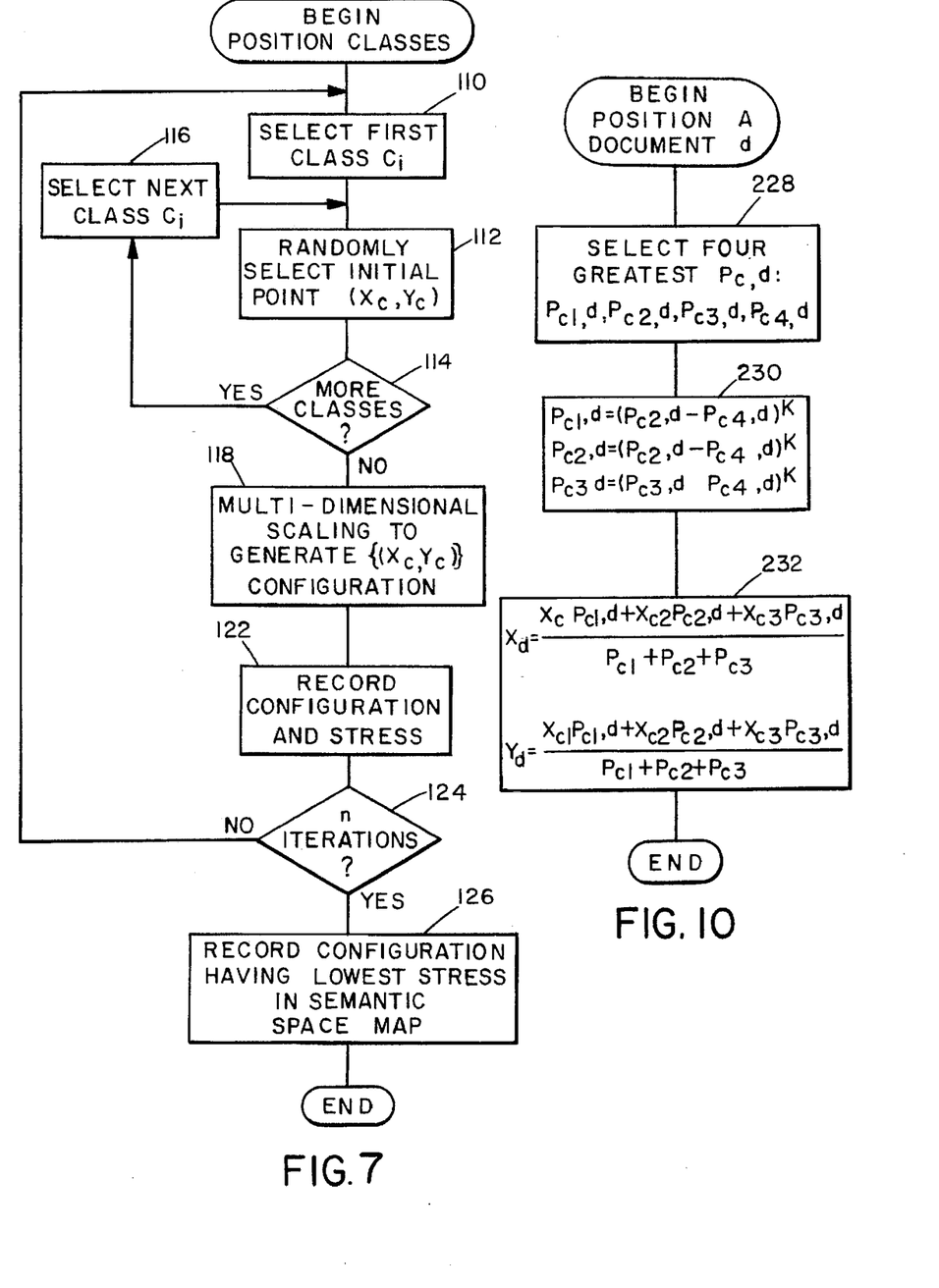
FIG. 7 is a flow diagram illustrating a method for positioning classes of a flat taxonomy in two-dimensional space.
FIG. 10 is a flow diagram illustrating a method for positioning a document in two dimensional space.
Figure 8A:
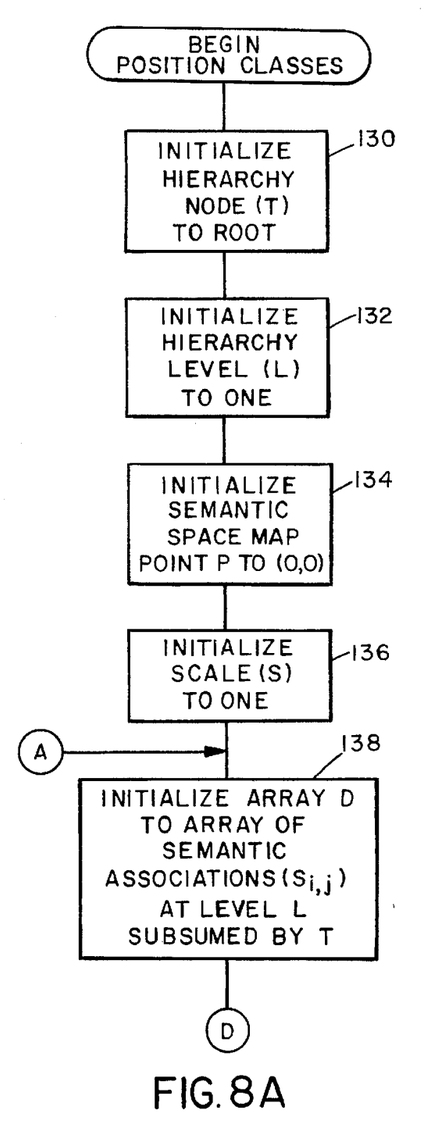
FIGS. 8 and 8A-8C are a flow diagram illustrating a method for positioning classes of a hierarchical taxonomy in two dimensional space.
Figure 8B:
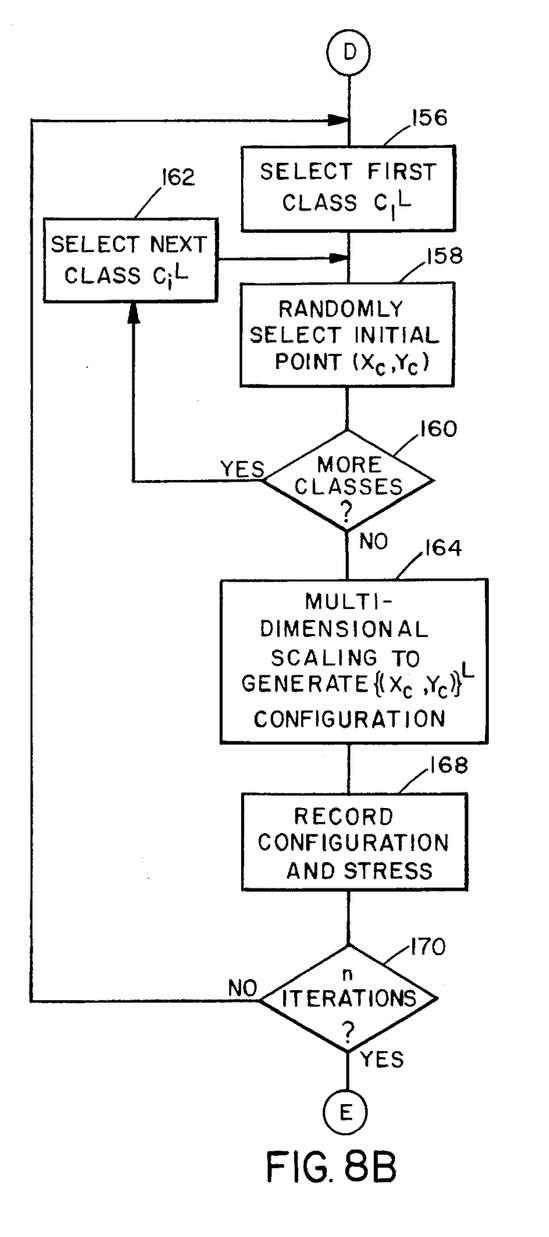
Figure 8C:
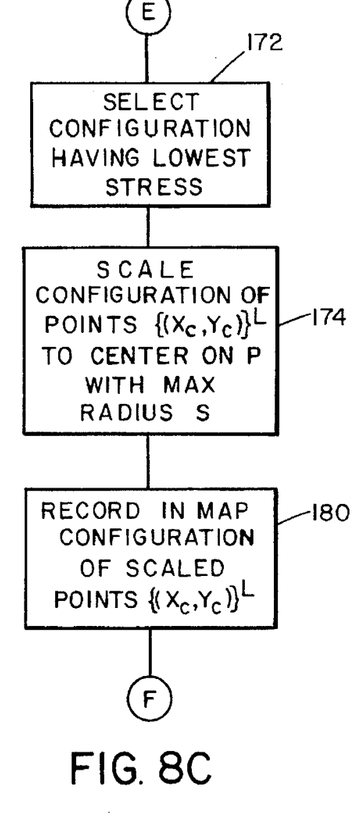
Figure 8D:
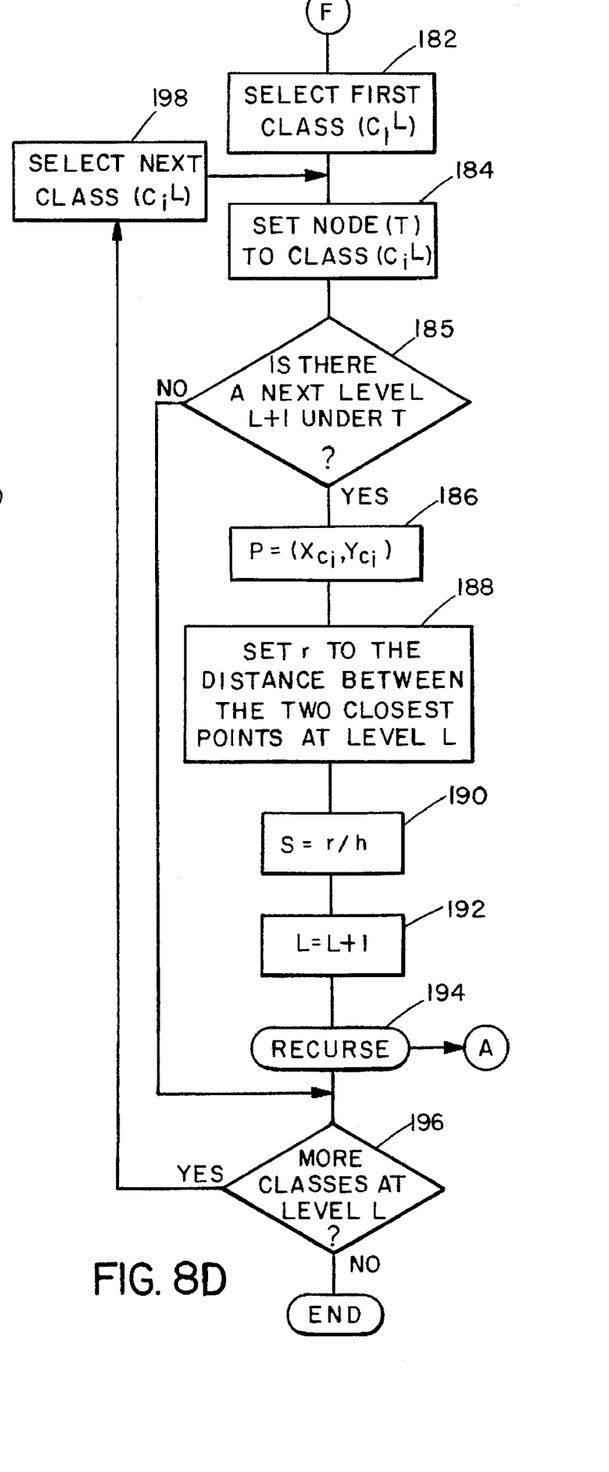

In an embodiment of the present invention in which the classes are arranged in a flat taxonomy, step 108 comprises the steps illustrated in FIG. 7. At step 110, the first class (c) is selected. At step 112, a corresponding random point, $(x_c, y_c)$, is generated. At step 114, it is determined whether all classes have been assigned random points. If the last class has not been assigned a random point, the method proceeds to step 116. At step 116, the next class (c) is selected, and the method returns to step 112. If all classes have been assigned random points, the method proceeds to step 118. At step 118, MDS is performed. The MDS method uses the points $(x_c, y_c)$ as initial positions and scales them using the semantic associations $S_{i,j}$ as inter-point similarities. Scaling is the optimization of the goodness-of-fit between the configuration and the inter-point similarities to produce an optimized configuration that better matches the inter-point similarities. The optimization method known as Conjugate Gradient is preferred. Conjugate Gradient, a method well-known to those of skill in the art, is described in William H. Press et al., *Numerical Recipes in C: The Art of Scientific Computing*, Cambridge University Press, 1988. The stress function known as Kruskal's stress is preferred, although Guttman's Point Alienation is also suitable. At step 122, the configuration stress is recorded. The method performs steps 110–122 for n iterations, where n is a number preferably greater than about 10. Iteratively performing steps 110–122 maximizes the likelihood that the lowest stress is a good fit to the inter-point similarities $S_{i,j}$ and is not the result of a poor initial point selection. At step 124, the method determines whether n iterations have been performed. At step 126, the point configuration having the lowest recorded stress is selected and recorded in the semantic space map 128 (FIG. 4).

In an embodiment of the present invention in which the classes are arranged in a hierarchical taxonomy, step 108 comprises the steps illustrated in FIG. 8. FIG. 8 is particularly arranged to illustrate traversal of the hierarchy using recursive software, although persons of skill in the art will be capable of implementing the method non-recursively in view of these teachings. At step 130, an initial node (T) in the hierarchy is selected and set to a value that represents the hierarchy root node. At step 132, the first level (L) below the root node of the hierarchy is selected. At step 134, an initial point (P) is set to a value of (0,0), which represents the center of the semantic space map. At step 136, a scale (s) is initialized to a value of one. At step 138, an array (D) is initialized by setting its values $(D_{i,j})$ equal to those of the array of semantic associations, $S_{i,j}$, at level L (i.e., classes i,j are those at level L subsumed by T).

At step 156, the first class at level L is selected. At step 158, a corresponding random point, $(x_c, y_c)$, is generated. At step 160, it is determined whether all classes have been assigned random points. If the last class has not been assigned a random point, the method proceeds to step 162. At step 162, the next class ($c^L$) is selected, and the method returns to step 158. If all classes have been assigned random points, the method proceeds to step 164. At step 164, MDS is performed. The MDS method uses the points $(x_c, y_c)$ as initial positions and scales them using the modified semantic associations $D_{i,j}$ as inter-point similarities. At step 168, the configuration stress is recorded. For the reasons described above with respect to FIG. 7, the method performs steps 156–170 for n iterations, where n is a number preferably greater than about 10. At step 170, the method determines whether n iterations have been performed. At step 172, the point configuration having the lowest recorded stress is selected.

At step 174, the selected configuration of points is scaled to center it on point P with a maximum radius equal to the scale s. At step 180, the scaled configuration of points representing the classes at level L is recorded in the semantic space map. As the steps described below indicate, if there are more levels the method will recurse. When the last level has been reached, the method processes another class at that level until all levels and classes have been processed and the method has thus traversed the hierarchy.

The method then prepares to traverse the next level in the hierarchy. At step 182, the first class ($c^L$) at level L is selected. At step 184, the node T is set to the class $c_i^L$. At step 185, it is determined whether there is another level L+1 under T. If so, processing continues with step 186. If not, processing continues with step 196. At step 186, point P is set to the position of the class $c_i$ at level L as determined at step 174. Steps 188 and 190 change the scale. At step 188, a number r is set equal to the smallest distance between any two points at level L. At step 190, the scale (s) is set equal to r/h, where h is a constant controlling the amount of separation between classes in the semantic map and preferably has a value between 10 and 100. At step 192, the level (L) is incremented. At step 194, the method recurses.

After recursion, processing continues at step 196. At step 196, it is determined whether there are more classes at level L. If the last class has not been processed, the method proceeds to step 198. At step 198, the next class at level L is selected, and the method returns to step 184. If the last class has been processed, all classes in the hierarchy have been positioned in the semantic space map.

Referring again to FIG. 4, the step 32 of populating the semantic space map with documents in the database comprises the step 200 of classifying the documents and the step 202 of positioning the documents in the semantic space map. A maximum likelihood estimation determines the most probable class for a document using the term frequency statistics generated at step 42. The database may include new documents 204 as well as the manually-classified initial documents 40.

Figure 9:
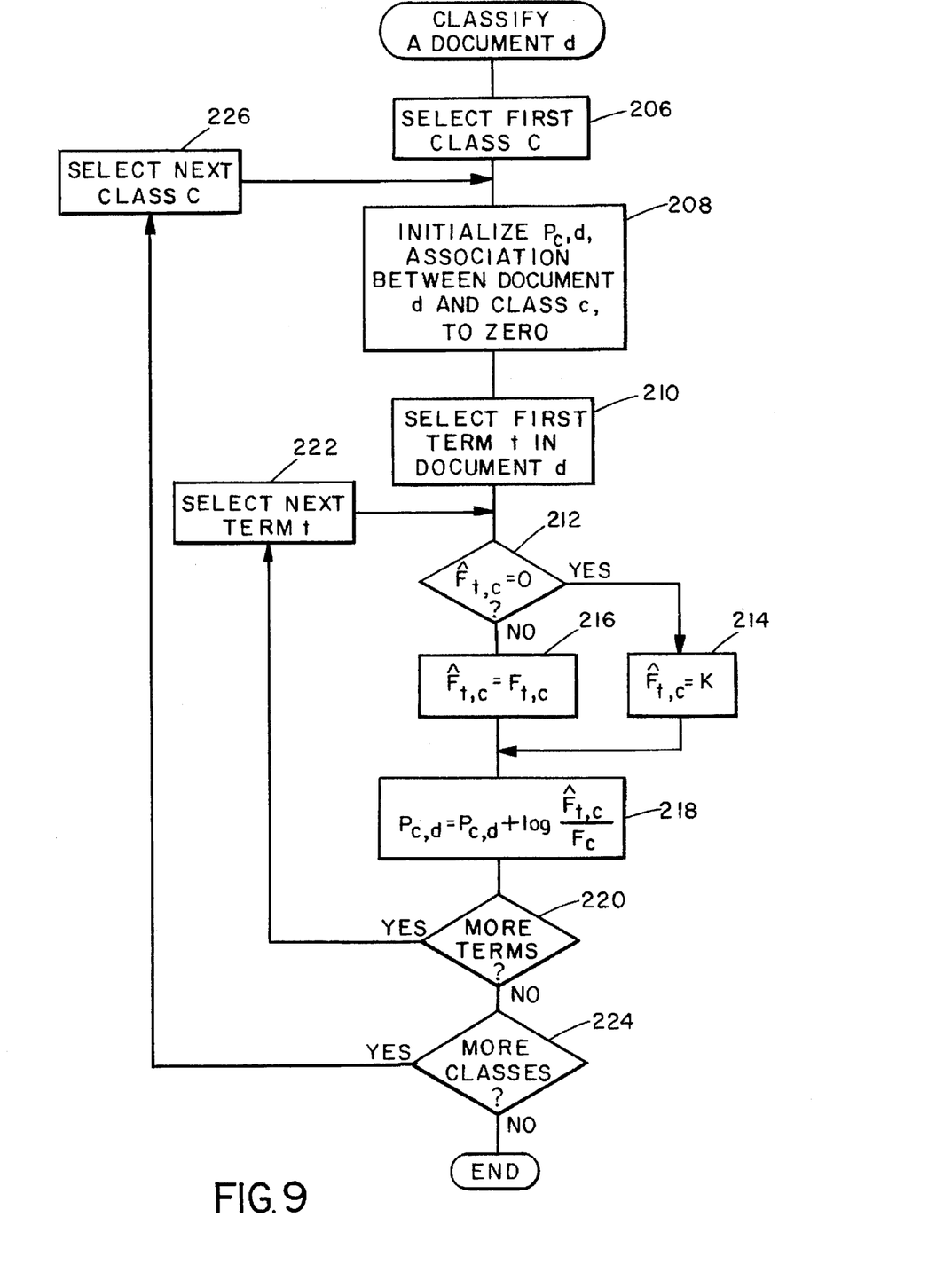
FIG. 9 is a flow diagram illustrating a method for classifying a document.

Step 200 comprises the steps illustrated in FIG. 9. The method classifies a document (d) in a class (c) by estimating the semantic association between the document and each class and selecting the class to which the association is greatest. At step 206, a first class c is selected. At step 208, a class score $P_{c,d}$ is initialized to zero. At step 210, the first term t in document d is selected. Bayesian classifiers require a non-zero weight for each term. Therefore, if the frequency ($F_{t,c}$) of the term t is zero in class c, it is replaced with a predetermined constant K that is small in relation to the frequency of the remaining terms. At step 212, it is determined whether $F_{t,c}$ is zero. If $F_{t,c}$ is zero, at step 214, a modified frequency $\hat{F}$ is set equal to the constant K, which is preferably between about 0.001 and 1.0. This range for constant K was empirically estimated based on cross-validation experiments in which the classifier was trained using a portion of the documents in the database and then used to classify the remaining documents. This range for constant K yielded acceptable classification results. If $F_{t,c}$ is non-zero, at step 216, the modified frequency $\hat{F}_{c,d}$ is set equal to $F_{t,c}$. At step 218, the natural logarithm of the ratio of $\hat{F}_{c,d}$ to $F_c$ is added to $P_{c,d}$. At step 220, it is determined if all terms t in document d have been processed. If the last term t has not been processed, the method proceeds to step 222. At step 222, the next term t is selected, and the method returns to step 212. If all terms t have been processed, the method proceeds to step 224. At step 224, it is determined whether all classes c have been processed. If the last class c has not been processed, the method proceeds to step 226. At step 226, the next class c is selected, and the method returns to step 208. Classification is complete when all classes c have been processed. The result of classification step 200 (FIG. 4) is a set of class scores $P_{c,d}$ for document d.

Figure 11:
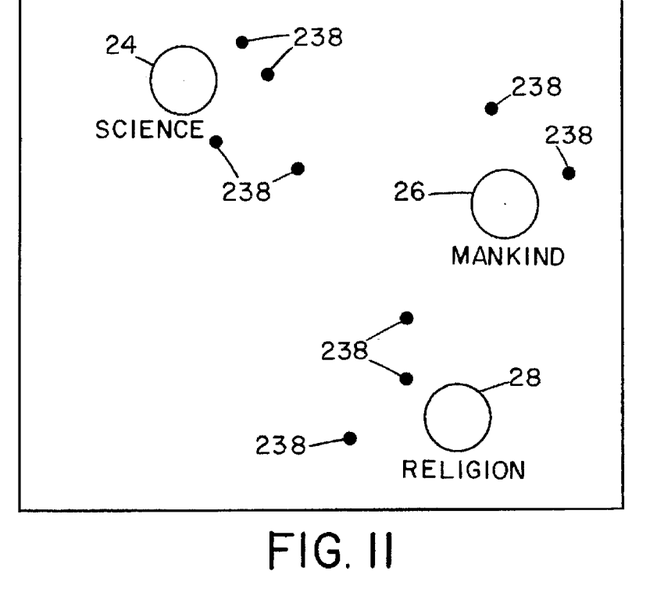
FIG. 11 illustrates an exemplary output of the system on a video display terminal, showing the upper level of a hierarchical taxonomy.
Figure 12:
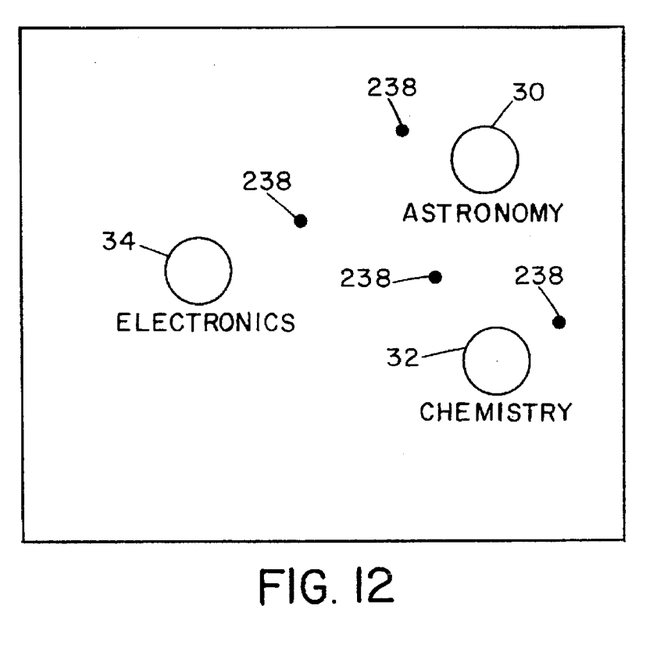
FIG. 12 illustrates an exemplary output of the system on a video display terminal, showing a lower level of the hierarchical taxonomy.

As illustrated in FIG. 11, retrieved documents 238 may be displayed on video display terminal 16 along with the classes to which they relate. In the example described above with respect to FIG. 3, three classes 24, 26 and 28 are designated "Science", "Mankind" and "Religion", respectively. As described above, the relative positions of classes 24, 26 and 28 and documents 238 represent the extent to which they are related to one another. Classes and documents that are closer to one another are more related, and classes and documents that are further from one another are less related. The user then may select one of documents 238 to display its text or may select one of classes 24, 26 and 28 to display a lower level of the hierarchy. As described above with respect to FIG. 3, class 24, which is designated "Science", has three subclasses 30, 32 and 34, which are designated "Astronomy", "Chemistry" and "Electronics", respectively. Therefore, selecting class 24 causes those retrieved documents 238 that relate to class 24 to be displayed, along with the subclasses 30, 32 and 34 of class 24, as illustrated in FIG. 12. As described above, documents 238 that relate to class 24 have positions relative to one another that represent the extent to which they are related to one another, and have positions relative to subclasses 30, 32 and 34 that represent the extent to which they are related to those subclasses.

The step 202 (FIG. 4) of positioning a classified document d in the semantic space map comprises the steps illustrated in FIG. 10. At step 228, the four highest class scores, $P_{c1,d}$, $P_{c2,d}$, $P_{c3,d}$ and $P_{c4,d}$ are selected. Document d is positioned in response to the weighted positions of the four classes to which the selected scores correspond. At step 230, each class score is adjusted to emphasize the higher scores relative to the lower scores. The highest score, $P_{c1,d}$, is adjusted by setting it equal to the difference between it and the lowest score, $P_{c4,d}$, with the difference raised to a power K greater than one. The next highest score, $P_{c2,d}$, is adjusted by setting it equal to the difference between it and the lowest score, $P_{c4,d}$, with the difference raised to the same power K. The next highest score, $P_{c3,d}$, is adjusted by setting it equal to the difference between it and the lowest score, $P_{c4,d}$, with the difference raised to the same power K. The lowest score, $P_{c4,d}$, is not adjusted. At step 232, the coordinates of the point at which document d is positioned are determined. The point, $(x_d, y_d)$, is the weighted mean of the positions of the classes $(x_c, y_c)$ corresponding to the four selected scores, as determined at step 108 (FIG. 4).

Returning to FIG. 4, the populated semantic space map 234 comprises the positions of the classes $(x_c, y_c)$ and the positions of the documents $(x_d, y_d)$. Step 34 of displaying the classes and retrieved documents comprises the step 236 of retrieving one or more documents 238 from a document storage and retrieval system and the step 240 of looking up the positions of the classes and the retrieved documents in the semantic space map. A user inputs a query 242 using any suitable query interface known in the art. For example, the query may be a simple Boolean expression such as "Big Bang and history," or it may be a complex natural language expression:

What is the history of the Big Bang theory? Describe the recent experiments confirming the Big Bang theory. Has the Big Bang theory had any impact on religion or philosophy?

Step 236 may retrieve documents in any suitable manner in response to query 242. Step 236 may search all documents, including both new documents 204 added to the database and the initial manually-classified documents 40, as indicated by the dashed line in FIG. 4.

Although all retrieved documents 238 and classes may be displayed immediately in response to query 242, in a preferred embodiment the classes alone are first displayed. The classes, i.e., the tokens or icons representing the classes on video display 16, may be modified or supplemented with information to convey to the user that retrieved documents relate to those classes. The user may select a class to display the related documents. The user may then select a document to display its text.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A method for visually representing the semantic relatedness between a predetermined plurality of classes and a plurality of documents, each document stored in a computer document retrieval system, said plurality of documents collectively comprising a plurality of terms in computer-readable format, each document having a tag representing the topical relatedness of said document to each said class, said method comprising the steps of:

generating a semantic space map in response to said terms and said tag of each document of said plurality of documents, said semantic space map representing the position in a plurality of dimensions of each class relative to every other said class, the spatial distance between said position of said each class and said every other class corresponding to the semantic relatedness of said each class to said every other class;

populating said semantic space map in response to said plurality of documents, said populated semantic space map representing the position in a plurality of dimensions of each class relative to every other class and of each document relative to each class, the spatial distance between said position of said each document relative to said each class corresponding to the semantic relatedness of said each document to said each class; and displaying a visual representation of at least a portion of said populated semantic space map.

2. The method claimed in claim 1, wherein said step of generating a semantic space map comprises the steps of:

generating a semantic association between each said class and every other said class in response to said plurality of documents; and multidimensionally scaling said plurality of classes in response to said semantic association between each said class and every other said class.

3. The method claimed in claim 2, wherein said step of generating a semantic space map further comprises the step of generating term frequency statistics in response to said plurality of documents.

4. The method claimed in claim 3, wherein said step of generating a semantic association comprises the step of generating a plurality of class conditional probability distributions, each corresponding to one of said classes and each comprising the probability of each said term occurring in said one of said classes.

5. The method claimed in claim 4, wherein said step of generating a semantic association comprises the steps of determining the Chi-Squared measure of distance between each class conditional probability distribution and every other said class conditional probability distribution.

6. The method claimed in claim 1, wherein said step of populating said semantic space map in response to said plurality of documents comprises the steps of:

producing a set of class scores for each said document using a statistical classifier to produce a classified document in response to said terms in said document; and positioning said classified document in said plurality of dimensions.

7. The method claimed in claim 6, wherein:

said statistical classifier is trained in response to said plurality of documents; and said step of populating said semantic space map comprises the steps of producing a set of class scores for a new document to produce a classified new document, and positioning said classified new document in said plurality of dimensions.

8. The method claimed in claim 6, wherein said step of producing a set of class scores comprises the step of performing a maximum likelihood estimation.

9. The method claimed in claim 8, wherein:

said step of generating a semantic association between each said class and every other said class comprises the step of computing the probability and frequency of each said term occurring in each said class; and said set of class scores is computed in response to said probability of each said term occurring in each said class.

10. The method claimed in claim 9, wherein:

if the probability of a term occurring in a class is nonzero, each class score is computed by summing, over said terms in each said document, the logarithm of the quotient of the frequency of said term occurring in said class divided by the sum of the sum of the frequencies of all terms occurring in said class; and if the probability of a term occurring in a class is zero, each class score is computed by summing, over said terms in each said class, the logarithm of the quotient of a predetermined constant divided by the sum of the frequencies of all terms occurring in said class.

11. The method claimed in claim 10, wherein said predetermined constant is greater than or equal to 0.001 and less than or equal to 1.0.

12. The method claimed in claim 6, wherein said step of positioning said classified document comprises the steps of:

selecting a predetermined number of class scores in each set, said selected class scores being greater than all other said class scores in said set;

normalizing said selected class scores to produce normalized class scores; and determining the weighted average of said positions of said classes corresponding to said normalized class scores using said normalized class scores as weights.

13. The method claimed in claim 1, wherein said step of displaying a visual representation of at least a portion of said populated semantic space map comprises the steps of:

querying a document retrieval system to produce a set of located documents; and displaying a visual representation of each said class and a visual representation of each said located document in response to said populated semantic space map.

14. The method claimed in claim 13, wherein:

the spatial distance between the visual representation of each class and the visual representation of every other said class corresponds to the semantic relatedness of said class to said every other said class; and the spatial distance between the visual representation of each located document and the visual representation of every other said located document approximately corresponds to the semantic relatedness of said located document to said every other said located document.

15. A system for displaying a visual representation of documents and classes to which said documents relate, comprising:

a document retrieval subsystem having a user input device for receiving a user query, a user output device for displaying graphical representations of documents and a predetermined plurality of classes, and memory for storing said documents, each said document having a topical association with one of said classes, said document retrieval system providing retrieved documents in response to said user query;

a classification subsystem for computing a semantic relatedness between each class and every other one of said classes and for producing a set of class scores for each stored document, each class score in said set representing a semantic relatedness between said stored document and one of said classes; and a visualization subsystem for producing a semantic space map in response to said semantic relatedness between each class and every other one of said classes, for populating said semantic space map with said stored documents in response to said sets of class scores and for displaying a populated semantic space map on said user output device.

16. A machine-readable computer data storage medium having stored therein a program, comprising:

a term frequency statistics generator for generating term frequency statistics in response to a plurality of pre-classified documents, each having a plurality of terms and each topically associated with a predetermined one of a predetermined plurality of classes;

a semantic space map generator for generating a semantic association between each class of said plurality of classes and every other class of said plurality of classes in response to said term frequency statistics and topical association between each document and predetermined one of said plurality of classes;

a multidimensional scaler for positioning said plurality of classes in a plurality of dimensions in a semantic space map in response to said semantic association between each said class and every other said class;

a statistical classifier for producing a set of class scores for a document in response to frequencies of terms in said document and for positioning said document in said semantic space map in response to said set of class scores, said set of class scores representing the semantic association between said document and each said class; and a semantic space map populator for positioning said document corresponding to said set of class scores in said semantic space map.

17. The data storage medium claimed in claim 16, wherein said semantic space map generator generates a plurality of class conditional probability distributions, each corresponding to one of said classes and each comprising the probability of each said term occurring in said one of said classes.

18. The data storage medium claimed in claim 17, wherein said semantic space map generator computes said semantic association in response to the Chi-Squared measure of distance between each class conditional probability distribution and every other said class conditional probability distribution.

19. The data storage medium claimed in claim 16, wherein said statistical classifier computes said set of class scores in response to a maximum likelihood estimation.

20. The data storage medium claimed in claim 19, wherein:

if the probability of a term occurring in a class is nonzero, said statistical classifier computes each class score by summing, over said terms in each said pre-classified document, the logarithm of the quotient of the frequency of said term occurring in said class divided by the sum of the sum of the frequencies of all terms occurring in said class; and if the probability of a term occurring in a class is zero, said statistical classifier computes each class score by summing, over said terms in each said class, the logarithm of the quotient of a predetermined constant divided by the sum of the frequencies of all terms occurring in said class.

21. The data storage medium claimed in claim 20, wherein said predetermined constant is greater than or equal to 0.001 and less than or equal to 1.0.

22. The data storage medium claimed in claim 16, wherein:

said semantic space map populator selects a predetermined number of class scores in each set, said selected class scores being greater than all other said class scores in said set;

said semantic space map populator normalizes said selected class scores to produce normalized class scores; and said semantic space map populator computes a weighted average of said positions of said classes corresponding to said normalized class scores using said normalized class scores as weights.

* * * * *